US010884546B2

(12) United States Patent
Vinas et al.

(10) Patent No.: US 10,884,546 B2
(45) Date of Patent: Jan. 5, 2021

(54) PROJECTION ALIGNMENT

(71) Applicant: Hewlett-Packard Development Company, L.P., Houston, TX (US)

(72) Inventors: Santiago Garcia-Reyero Vinas, San Diego, CA (US); Jinman Kang, San Diego, CA (US); David Bradley Short, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/508,379

(22) PCT Filed: Sep. 4, 2014

(86) PCT No.: PCT/US2014/054029
§ 371 (c)(1),
(2) Date: Mar. 2, 2017

(87) PCT Pub. No.: WO2016/036370
PCT Pub. Date: Mar. 10, 2016

(65) Prior Publication Data
US 2017/0308242 A1    Oct. 26, 2017

(51) Int. Cl.
*G03B 21/10* (2006.01)
*G09G 3/00* (2006.01)
(Continued)

(52) U.S. Cl.
CPC ............ *G06F 3/0418* (2013.01); *G06F 3/041* (2013.01); *G06F 3/0425* (2013.01);
(Continued)

(58) Field of Classification Search
CPC  G06F 3/0418; H04N 9/2141; H04N 1/00127; G02B 6/06; G06T 7/13; G03B 21/10
See application file for complete search history.

(56) References Cited

U.S. PATENT DOCUMENTS

| 6,367,933 B1 * | 4/2002 | Chen | H04N 3/2335 |
| | | | 348/744 |
| 6,618,076 B1 * | 9/2003 | Sukthankar | H04N 5/74 |
| | | | 345/156 |

(Continued)

FOREIGN PATENT DOCUMENTS

| JP | 3409330 B2 | 5/2003 |
| JP | 2011-250034 A | 12/2011 |

(Continued)

OTHER PUBLICATIONS

Matthew Flagg et al., "Improving the Speed of Virtual Rear Projection: A GPU-Centric Architecture," GVU Center and College of Computing, May 26, 2005, pp. 1-7, cc.gatech.edu.

(Continued)

*Primary Examiner* — Lin Li
(74) *Attorney, Agent, or Firm* — Dicke Billig & Czaja PLLC

(57) ABSTRACT

A projection system includes a video projector to project images having an image region on a surface having a border area associated with the surface, and a processing system including a graphical processing unit to evaluate the border area and the projected image region, the graphical processing unit to transform the projected image region into an aligned projected image region coinciding with the border area.

12 Claims, 6 Drawing Sheets

(51) Int. Cl.
  *H04N 9/31* (2006.01)
  *G06T 11/00* (2006.01)
  *G06T 7/00* (2017.01)
  *G03B 21/14* (2006.01)
  *H04N 3/23* (2006.01)
  *H04N 5/74* (2006.01)
  *G06F 3/042* (2006.01)
  *G03B 17/54* (2006.01)
  *G09G 5/00* (2006.01)
  *G06F 3/041* (2006.01)

(52) U.S. Cl.
  CPC ......... *G06F 3/0428* (2013.01); *H04N 9/3185* (2013.01); *H04N 9/3194* (2013.01)

(56) References Cited

U.S. PATENT DOCUMENTS

| | | | |
|---|---|---|---|
| 7,256,772 B2 | 8/2007 | Morrison | |
| 7,427,983 B1* | 9/2008 | Hildebrandt | H04N 1/00127 178/18.01 |
| 7,599,561 B2 | 10/2009 | Wilson et al. | |
| 7,710,391 B2 | 5/2010 | Bell et al. | |
| 7,864,203 B1* | 1/2011 | Fear | G09G 5/003 345/698 |
| 8,121,640 B2 | 2/2012 | Russ et al. | |
| 8,199,117 B2 | 6/2012 | Izadi et al. | |
| 8,736,583 B2 | 5/2014 | Anderson et al. | |
| 2002/0126136 A1* | 9/2002 | Lin | G06F 3/0425 345/619 |
| 2005/0073661 A1* | 4/2005 | Tamura | H04N 9/3185 353/70 |
| 2005/0078092 A1 | 4/2005 | Clapper | |
| 2006/0038962 A1 | 2/2006 | Matsumoto et al. | |
| 2006/0109430 A1* | 5/2006 | Allen | G03B 21/142 353/101 |
| 2006/0203207 A1 | 9/2006 | Ikeda et al. | |
| 2007/0147705 A1 | 6/2007 | Clune et al. | |
| 2008/0018591 A1 | 1/2008 | Pittel et al. | |
| 2009/0207411 A1 | 8/2009 | Oakley | |
| 2009/0284538 A1* | 11/2009 | Lin | G06T 1/20 345/552 |
| 2010/0054545 A1* | 3/2010 | Elliott | A61B 5/0059 382/115 |
| 2010/0238188 A1 | 9/2010 | Miceli | |
| 2011/0055729 A1* | 3/2011 | Mason | G06F 3/0425 715/753 |
| 2011/0242054 A1 | 10/2011 | Tsu | |
| 2012/0001931 A1* | 1/2012 | Hsieh | G09G 3/001 345/581 |
| 2012/0162061 A1* | 6/2012 | Hildebrandt | G06F 3/03545 345/156 |
| 2012/0194562 A1* | 8/2012 | Ivashin | G09G 3/001 345/672 |
| 2012/0249463 A1* | 10/2012 | Leung | G06F 3/017 345/173 |
| 2013/0077236 A1 | 3/2013 | Becze et al. | |
| 2013/0121601 A1* | 5/2013 | Yu | G06T 7/00 382/224 |
| 2013/0215138 A1* | 8/2013 | Suzuki | H04N 9/3182 345/593 |
| 2014/0085610 A1 | 3/2014 | Viswanathan et al. | |
| 2014/0146080 A1 | 5/2014 | Ivashin et al. | |
| 2014/0292647 A1* | 10/2014 | Murase | G03B 17/54 345/156 |
| 2016/0334938 A1* | 11/2016 | Kang | G03B 21/28 |

FOREIGN PATENT DOCUMENTS

| | | | |
|---|---|---|---|
| TW | 200541329 A | 12/2005 | |
| TW | 200701786 A | 1/2007 | |
| TW | 200818114 A | 4/2008 | |
| TW | 201421142 A1 | 6/2014 | |
| WO | WO 2015/116220 A1 * | 8/2015 | ..... G06F 2200/1631 |

OTHER PUBLICATIONS

Shahram Izadi et al., "C-Slate: A Multi-Touch and Object Recognition System for Remote Collaboration using Horizontal Surfaces," 2007, pp. 3-10, IEEE.

* cited by examiner

PROJECTION ALIGNMENT

BACKGROUND

Projection systems display video signals that can represent still, partial motion, or full motion display images. The relative alignment of the projected image source and the projection surface affect the amount of keystone distortion in the displayed image. Keystone distortion can result when a projector projects an image along a projection axis that is non-orthogonal to the projection surface or display. The projector can be misaligned to the projection surface before or during projection causing single or multi-dimensional keystone distortion.

DETAILED DESCRIPTION

In the following detailed description, reference is made to the accompanying drawings which form a part hereof, and in which is shown by way of illustration specific examples in which the disclosure can be practiced. It is to be understood that other examples can be utilized and structural or logical changes can be made without departing from the scope of the present disclosure. The following detailed description, therefore, is not to be taken in a limiting sense, and the scope of the present disclosure is defined by the appended claims. It is to be understood that features of the various examples described herein can be combined, in part or whole, with each other, unless specifically noted otherwise.

Misalignment of various components of an example projecting system can occur affecting the projection and viewing of images. Factory calibrated settings can be disturbed during shipment or set-up, for example. In another example, a touch sensitive projection display mat position is changed relative to a projector. In another example, projector is positioned at a location at an angle to the projection display mat or at a distance from the projection display mat such that the resulting images projected onto the mat do not fill the projection surface. In any regard, misalignment can affect the resultant position of the projected image(s) onto the projection display mat.

Correction of rotation, skew or asymmetric distortion can be computationally intensive and thus employing a large amount of high central processing unit (CPU) resources, often slowing down other functions of the CPU. Examples provide real-time display alignment by adjusting a projector display through graphical processing unit (GPU) processes, allowing for a variety of adjustments to occur. Examples provide flexible and accurate projector alignment that can address four corner alignment with precise projector display control.

Figure 1:
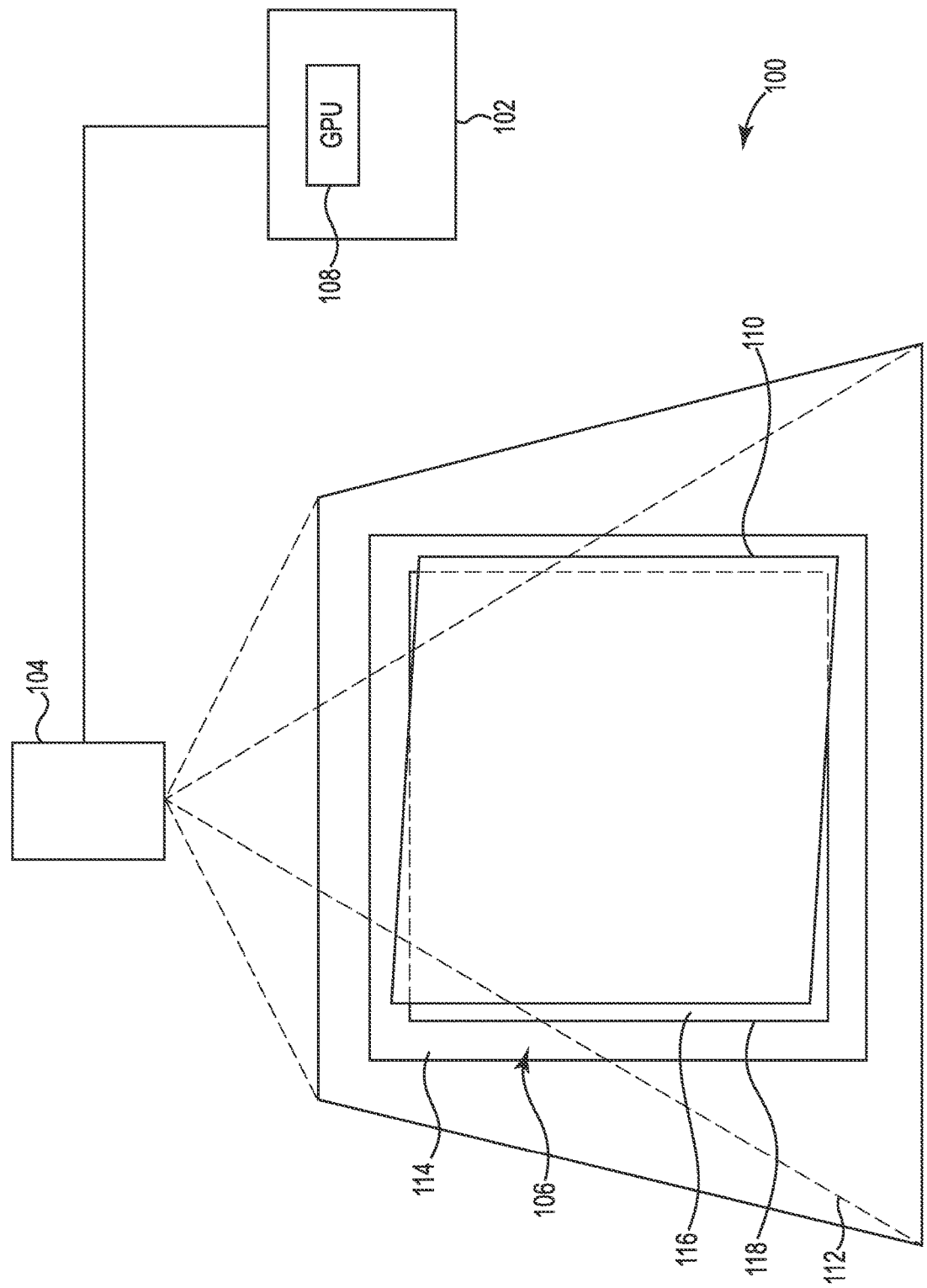
FIG. 1 is a diagram illustrating an example of a projection system in accordance with the present disclosure with a misaligned projection.

As illustrated in FIG. 1, an example projection system 100 includes a computing device, or processing unit, 102 and a projector 104. Projection system 100 can include a projection display 106. Computing device 102 includes at least one GPU 108 and can include at least one CPU 140 (see, e.g., FIG. 3). Computing device 102 is communicatively connected to projector 104 through a wireless or wired connection. Computing device 102 can be a laptop computer, desktop computer, a tablet, a smart phone, or other device or processing system capable of electronic computing.

In general, computing device 102 communicates with projector 104 to project an image or series of images onto projection display 106. The image projected by projector 104 can be any type of image, including but not limited to, information and/or images produced by instructions received by or stored in computing device 102. Projector 104 projects an image having a projected region of interest 110 within a total projection area 112. In one example, projection area 112 is a trapezoidal area that includes projector display region of interest 110. Projector 104 can be any type of video or image projector including rear or forward projecting projectors including a light source. Projection system 100 can include one or more projectors 104. When multiple projectors 104 are used, they can be coordinated to project complete, whole images from multiple locations onto projection display 106 or project a series of partial images aligned together across projection display 106 to create a complete image. Projector 104 is capable of producing at least two-dimensional images. In some examples, projector 104 is capable of producing three-dimensional images.

Projection display 106 can be any substantially planar or flat horizontal or vertical surface suitable for two-dimensional (2D) projection display. For example, projection display 106 can be a projection screen, a white board, or a touch sensitive mat, as described farther below. In some examples, projection display 106 is suitable for three-dimensional (3D) projection.

As discussed above, in some examples, projection display 106 is a touch sensitive mat. Projection display, or touch sensitive mat, 106 includes a front surface 114 suitable for displaying an image or series of images. Front surface 114 includes a projector display area 116 and a border 118. Front surface 114 of touch sensitive mat 106 includes a touch sensitive surface of any suitable touch sensitive technology for detecting and tracking one or multiple touch inputs by a user in order to allow the user to interact with software being executed by computing device 102 or some other computing device (not shown) communicating with projector 104 and computing device 102. In some examples, touch sensitive surface 120 extends over the entire front surface 114. Alternatively, touch sensitive surface 120 includes only a portion of front surface 114. Touch sensitive surface 120 can utilize known touch sensitive technologies such as optical, infrared, resistive, capacitive, strain gauge, acoustic wave, acoustic pulse recognition, or combination thereof. User interaction with touch sensitive mat 106 can adjust or modify the display and information content through suitable touch to mat 106 with a user's hand, stylus, or other suitable instrument.

Touch sensitive surface 120 and computing device 102 are electrically coupled to one another such that user inputs received by surface 120 are communicated to computing device 102. Touch sensitive surface 120 and computing device 102 can be electrical connected with a suitable wireless or wired connection. For example, as with other electrical connections of projection system 100, WI-FI, BLUETOOTH®, ultrasonic, electrical cables or other suitable electrical connection can be used.

In some examples, computing device 102 directs projector 104 to project an image onto surface 114 of projection display 106. The image projected by projector 104 can include information and/or images produced by software executing within device 102. A user (not shown) can interact with the image displayed on surface 114 by physically engaging the touch sensitive surface 120 of projection display 106. Such interaction can take place through any suitable method such as, direct interaction with a user's hand, through a stylus, or other suitable user input device(s).

Figure 3:
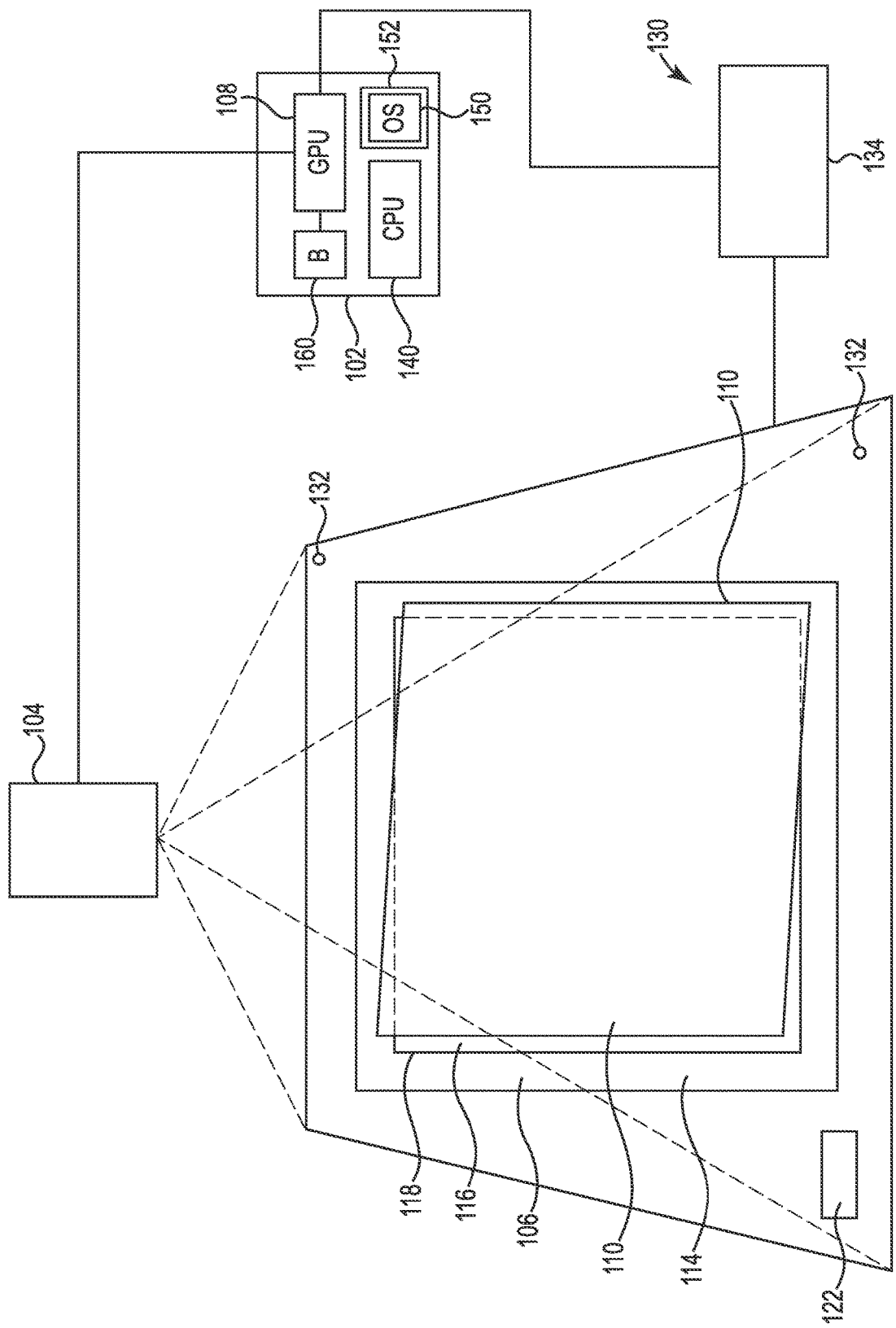
FIG. 3 is a diagram illustrating an example of a projection system in accordance with the present disclosure.

With reference to FIG. 3 an example projection display 106 can include an extended control area 122. A user (not shown) can interact with the image displayed on surface 114 by physically engaging extended control area 122. Extended control area 122 can be on the touch mat 106 or can be outside the touch mat 106. Extended control area 122 can be positioned outside display area 116. Extended control area 122 provides for touch sensitive interactions from a user, for example, via the user's hand or stylus (not shown) for further instruction and/or adjustment.

With reference to FIG. 3, an example projection system 100 can include a sensing system 130 having a sensor 132 or cluster of sensors 132 to detect various parameters occurring on or near projection display 106. A camera 134 can be used with sensors 132 to detect various parameters, including alignment, on or near projection display 106. Camera 134 and sensors 132 are oriented to acquire images or data from touch sensitive mat 106. In some examples, camera 134 is a high resolution color camera. Sensors 132 can include light sensors, depth sensor, or three-dimensional user interface sensors, for example. In one example, at least one sensor 132 is arranged to measure the intensity of ambient light of the environment surrounding the projection system 100 or the intensity of light reflected from various areas of the projection display 106. For example, border 118 can be a first color and projection display area 116 can be a second color different than the first color. Detection of portions or all of the first color of border 118 and/or area 116 can indicate correct and aligned projection or misaligned projection of region of interest 110 onto projection display 106. Camera 134 can include sensors 132 or communicate with sensors to detect the intensity of light along the surface of projection display 106.

In some examples, sensor 132 is arranged to measure the intensity of light of the environment surrounding projection system 100 and color, or reflected light, of touch mat border 118 and projection display area 116. Sensors 132 have geometric correlation to projection display 106. Projection display 106 defines the area that sensors 132 within the sensor bundle are arranged to monitor and/or detect the conditions previously described. Each of the sensors 132 within bundle is electrically and communicatively coupled to computing device 102 such that data generated by sensors 132 can be transmitted to computing device 102 and commands issued by computing device 102 can be communicated to the sensors 132 during operation. As is explained above for other components of projection system 100, any suitable electrical and/or communicative coupling can be used to couple sensor bundle 132 to computing device 102 such as for example, an electric conductor, WI-FI, BLUETOOTH®, an optical connection, an ultrasonic connection, or some combination thereof.

FIG. 1 provides an example of the native, or initial, display output from projector 104 not aligned with, or coincident with, projector display area 114 of touch sensitive mat 106. Referring to FIG. 1, projection region of interest 110 is rotated, for example, by 10 degrees, such that projection region of interest 110 is misaligned with respect to touch mat border 118. As an example, projection region of interest 110 can be inadvertently rotated or displaced due to changes made to the positioning one or both of projector 104 and mat 106. As a result, the projection display region of interest 110 does not fully utilize the surface area of the touch sensitive mat 106, or can fall at least partially outside the area of the touch sensitive mat 106. The portions of projection region of interest 110 that are no longer within the touch mat border 118 are not properly viewable by a user.

With reference to FIGS. 1 and 3, during operation, light is emitted from projector 104 and directed towards projection display 106 forming projection area 116 at least partially displaying projected display region of interest 110 having an image at least partially disposed on projection display 106. In this example, region of interest 110 and touch mat border 118 are substantially rectangular and initially misaligned.

Figure 2:
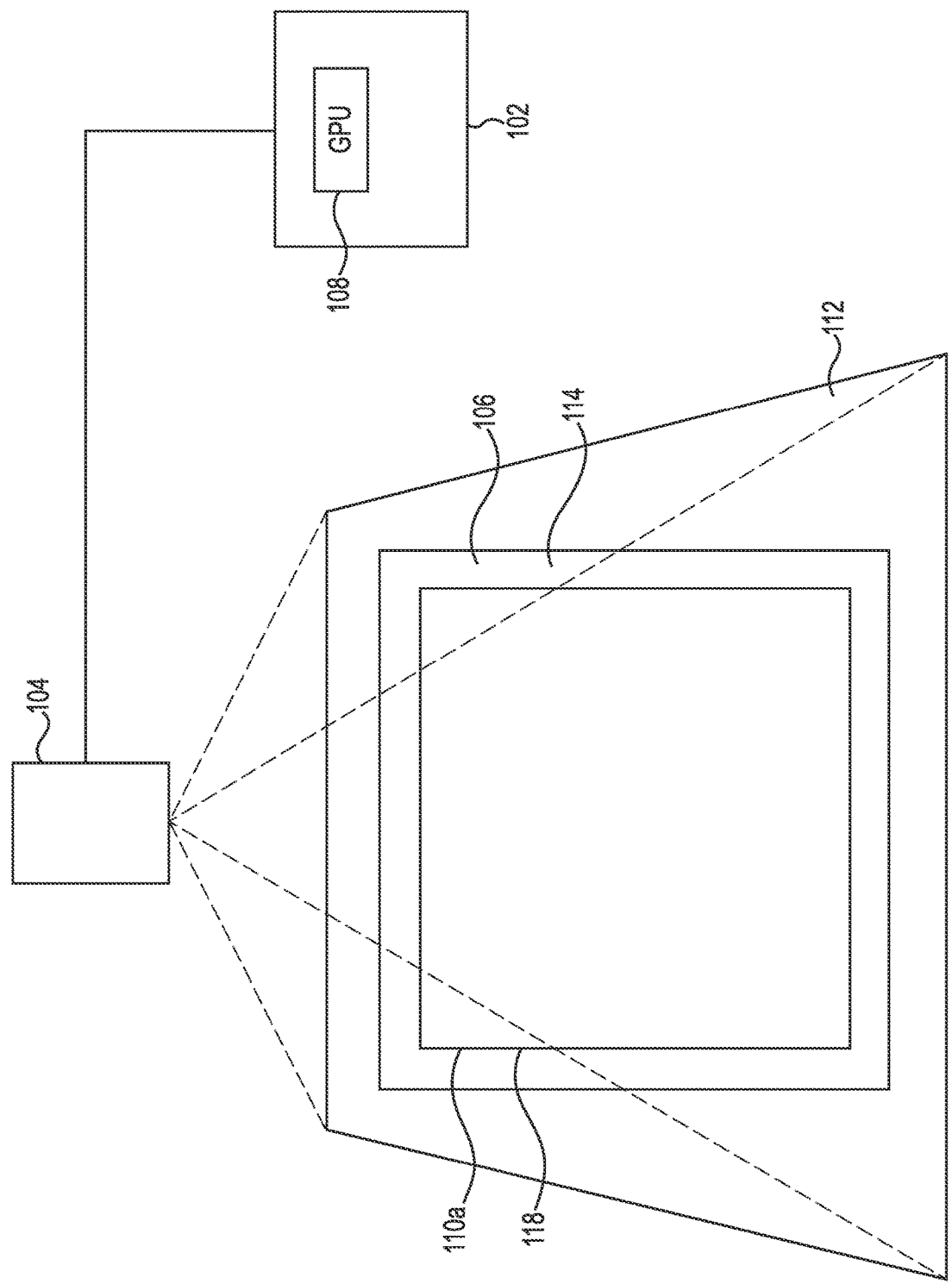
FIG. 2 is a diagram illustrating an example of the projection system of FIG. 1 with an aligned projection in accordance with the present disclosure.

FIG. 2 illustrates an example of region of interest 110 of the projected image of FIG. 1 aligned with touch mat border 118. Examples disclosed herein effectively integrate the functionality of GPU 108 to align projector region of interest 110 within the defined area of touch mat border 118. Alignment can correctly correlate images onto touch sensitive mat 106. Alignment of original projected or region of interest 110 onto projection display 106 can be through any three-dimensional rotational or realignment of the original image projection. GPU 108 processing corrects misalignment of region of interest 110. The corrected, or aligned, image is projected from projector 104. GPU 108 can provide continuous monitoring and alignment, or can run periodically to meet a determined threshold or by a user. For example, a threshold of misalignment can be set by a user or preset; upon exceeding the determined threshold, the projection is automatically realigned. Camera 134 and sensors 132 detect display output content of the region of interest 110 onto projection display 106 and communicate with computing device 102.

Figure 4:
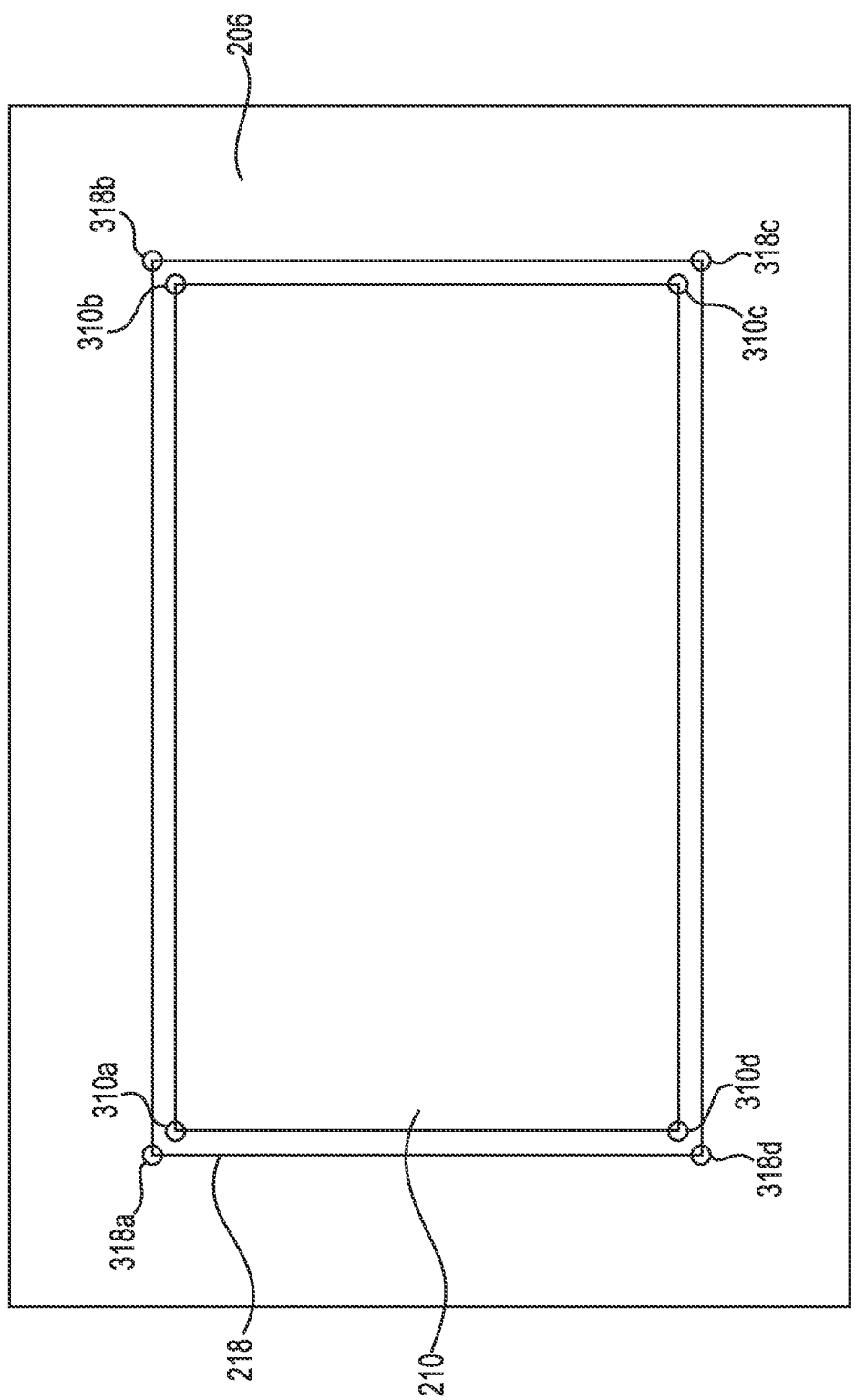
FIG. 4 is a diagram illustrating an example of a projection display misalignment in accordance with the present disclosure.

FIG. 4 illustrates an example of a projected region of interest 210 misaligned with a border 218. Alignment of projected region of interest 210 within border 218 can be verified by detecting corners of projection display 206, and in some example corners of border 218, and corners of region of interest 210, and determining any correspondence between the sets of corners, based according to mapping methods, such as homography. As an example, vector offsets can be generated between the two sets of corners in order to determine any correspondence. Based upon the differences detected between the two sets of corners, calibration operations can be performed by GPU 108, as will be further described.

FIG. 4 is reflective of another example misalignment. In the example illustrated in FIG. 4, corners of touch mat border 218 (e.g., 318a-d) extend along an area of touch sensitive mat 206 greater than corners of initial projected region of interest 210 (e.g., 310a-d). In other words, region of interest 210, and thus corner 310a-d are positioned interior of corners 318a-d of touch mat border 218. Sensors 132 (see, e.g., FIG. 3) can be used to detect corners 310a-d and corners 318a-d.

Referring to the detection of the corners 318*a-d* of the touch mat border 218, camera 134 (see, e.g., FIG. 3) can be used to take either a still image or a video of the whole mat 206, or at least relevant portions of the mat 206. A histogram of the image/video can provide regions of interest, generally providing an indication of the difference in color intensity between the first color of touch mat border 218 and the second color of projection display area 216 reflecting at least a portion of region of interest 210. Histogram equalization can be performed on the regions of interest to obtain high and low thresholds for an edge detection technique (e.g., Canny edge detection). Upon running the edge detection technique, edge points indicating the perimeter of the region of interest 218 can be extracted (e.g., edge points for all four sides of the region 218). A line fitting technique can be used for determining four fitted lines, which can be representative of the perimeter of border 218. Intersection of two lines from the four fitted lines can be used for calculating each corner 318*a-d*. When the image region of interest 110 is captured by color camera 134, corners 318*a-d* of the touch mat border 218 can be determined even if one or more of the corners is occluded by an object in the still image (see, e.g., FIG. 1) due to difference in color intensities.

Similarly, corner detection can be performed to detecting corners 310*a-d* of the projected region of interest 210. For example, sensors 132 can differentiate a color intensity of projected region of interest 210 from a color intensity of an area outside the projected region of interest 210. Upon detecting the corners 310*a-d* and the corners 318*a-d*, correspondence between the two sets of corners can be determined, based according to mapping methods, such as homography. For example, based upon the correspondence between the two sets of corners, projector 104 can adjust settings for region of interest 210 reflected on to mat 206 to correspond to the detected border 218 of mat 206.

In accordance with the examples above, colors and/or corners of border 118, 218 and region of interest 110, 210 are detected and applied into an alignment transformation (e.g., prospective warping transformation) performed by GPU 108. The alignment transformation is applied to the projector display region of interest 110, 210. Alignment, or prospective warping, transformation is performed by GPU 108 to align the four corners of the touch mat border 118, 218 to the four corners of the projected display region of interest 110, 210. For example, a three by three dimensional matrix values are assigned to the corner positions and transformation of corner positions is performed and applied to coordinate alignment of corners 318*a-d* and 310*a-d*.

The aligned region of interest 110*a*, or corrected image display, is overlaid onto the projection display 106 using a GPU overlay buffer. Region of interest 110*a* is applied by GPU 108 to projector 104 for projection onto display area 116. The GPU overlay buffer can be varied to allow for extended control area 122 outside of the active area of touch mat 106 and can be used for extended control of the display. In other words, the GPU overlay aligns areas or corners of region of interest 110 to align or modify the image display to correspond with border 118. The native/original display region of interest 110 formation is overlaid by the corrected display region of interest 110*a*.

With reference to FIG. 3, computing device 102 can include an Operating System (OS) 150, a memory 152, and a content display buffer 160. Memory 152 is suitable for storing data and parameters, operating system software, application software, and other instructions. Computing device 102 can include other removable and/or non-removable storage where memory 152, the non-removable storage, and the removable storage are implemented in computer readable storage media. Memory 152 and the other computer readable media in computing device 102 can include volatile and/or non-volatile storage memory.

Memory 152 can store OS 150. OS 150 can be any operating system suitable to coordinate software and hardware of computing device 102 such as Microsoft Windows®, Unix®) or Linux®, for example. In one example, CPU 140 controlled by OS 150 executes instructions stored in memory 152 to provide image content to buffer 160 for temporary storage. GPU 108 accesses the image content from the content display buffer 160. Distortion, or misalignment, is corrected by GPU 108 so that aligned region of interest 110*a* of protection 112 is consistent with display area 116. Instructions stored in memory 152 for image alignment operations are executed GPU 108 independent of OS 150 and CPU 140 for process and performance optimization of projection system 100. In some examples, color correction can also be performed by GPU 108.

During use, aligning the projector display region of interest 110 to border 118 employs border 118 and projector display area detection from the calibrated sensors 132 and camera 134. Content display buffer of OS 150 stores content data of the image and GPU 108 creates a warped or aligned display content using the calculated alignment transformation image data stored in a corrected content display buffer of GPU 108. Corrected, or aligned, image content display is projected by projector 104. The aligned image projection can be overlaid, or projected over, the original image projection. For example, the original image can be projected transparently and the aligned image projected over the original image and within the projection area.

Figure 5:
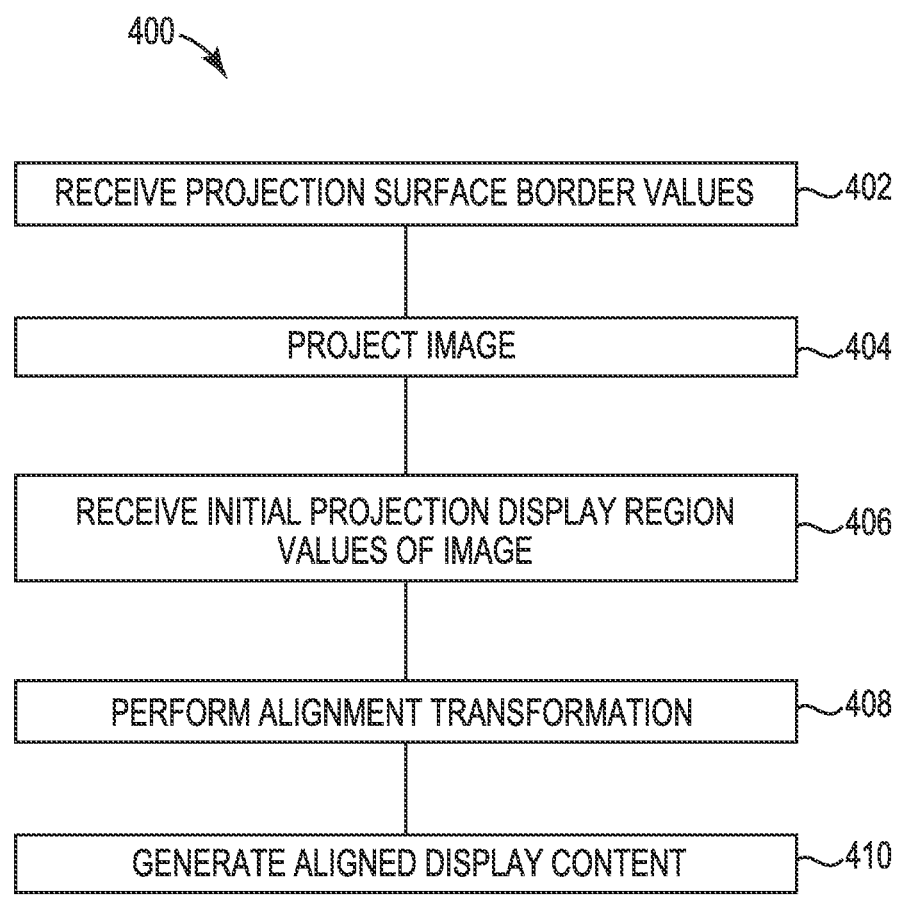
FIG. 5 is a flow diagram illustrating an example method for adjusting a projected image in accordance with the present disclosure.

FIG. 5 is a flow diagram illustrating one example of a method 400 for adjusting projected image. Method 400 can be performed via instructions stored in memory 152 that control projection system 100. At 402, projection surface border values corresponding to a surface border location of a projection surface are received. At 404, an initial image is projected onto the projection surface. At 406, initial projection display region values of the image projection corresponding to location of the image projection on the projection surface are received. 406 can occur before, after, or simultaneously with step 402. At 408, an alignment transformation is performed based on the received projection surface border values and the initial projection display region values. At 410, an aligned display content to adjust the image projection location values to coincide with the projection surface border location values is generated. As illustrated in FIG. 2, aligned content is projected onto touch mat 106 by projector 104.

Figure 6:
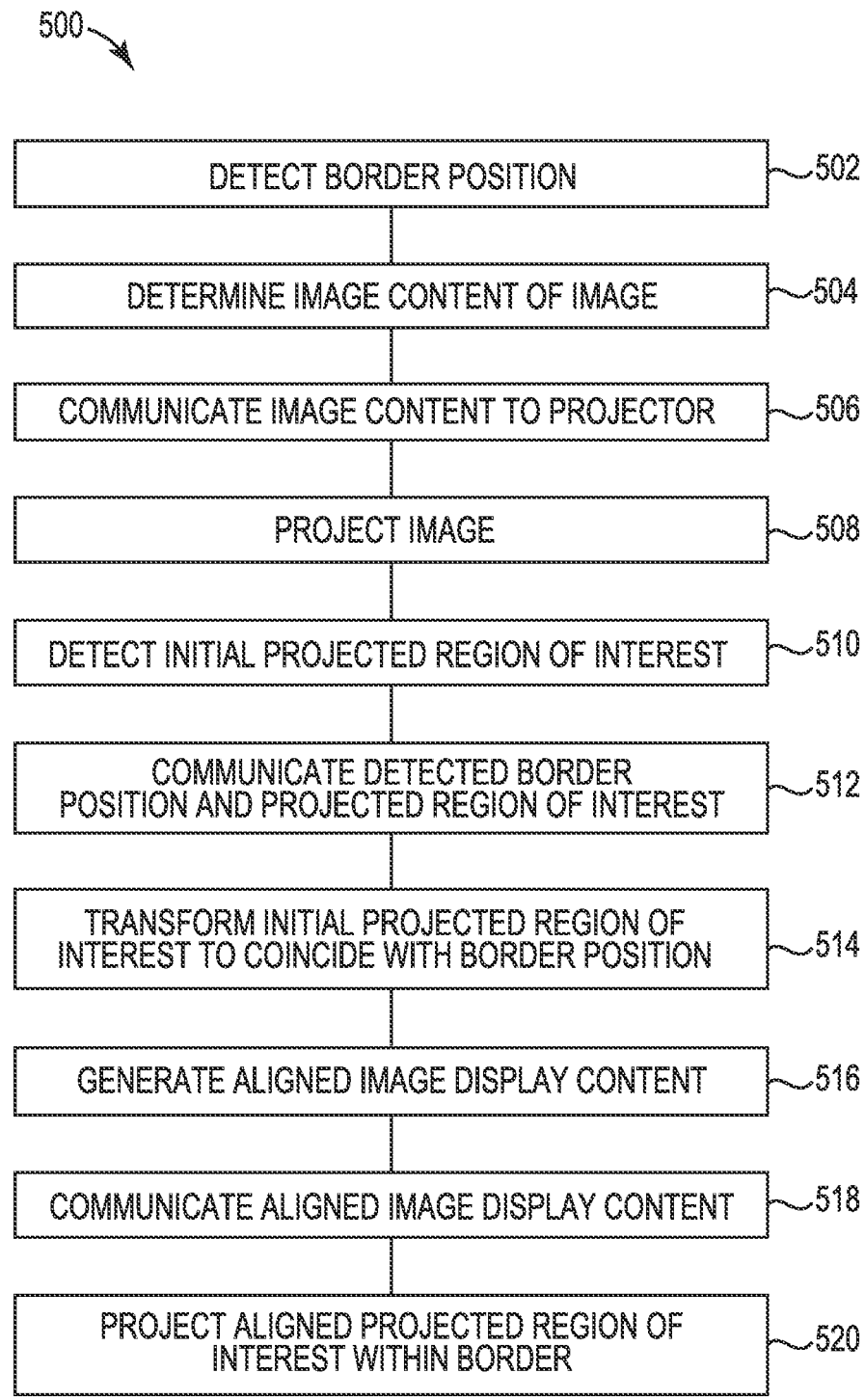
FIG. 6 is a flow diagram illustrating an example method for adjusting a projected image in accordance with the present disclosure.

FIG. 6 is a flow diagram illustrating one example of a method 500 for adjusting a projected image. Method 500 can be performed via instructions stored in memory 152 that control projection system 100. At 502, a border position of a projection surface is detected via a sensing system. At 504, image content of an image in a processing system is determined. At 506, the image content is communicated to a projector. At 508, the image is projected toward the projection surface via the projector. The projected image has an initial projected region of interest within a projected display. At 510, the initial projected region of interest is detected via the sensing system. At 512, the detected border position and the projected region of interest is communicated from the sensing system to the processing system. At 514, the initial projected region of interest is transformed to coincide with the border position. At 516, aligned image display content of an aligned projected region of interest coinciding with the border position is generated. At 518, the aligned image display content is communicated to the projector. At 520, the aligned projected region of interest is projected within the border. The aligned projected region of interest is projected onto the mat over the initial projected region of interest.

Although specific examples have been illustrated and described herein, a variety of alternate and/or equivalent implementations can be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A projection system comprising:
a video projector to project an initial image having an initial projected region of interest on a surface having a border area associated with the surface; and
a processing system including:
memory to store an operating system and instructions;
a first content display buffer to store image content;
a central processing unit controlled by the operating system to execute the instructions to provide the image content including the initial image to the first content display buffer;
a graphical processing unit comprises a second content display buffer; and
the graphical processing unit directly coupled with a sensing system to be independent of the operating system and the central processing unit evaluate the image content including the initial image in the first content display buffer, the border area, and the initial projected region of interest,
the graphical processing unit to transform the initial projected region of interest into an aligned projected region of interest coinciding with the border area and store an aligned image having the aligned projected region of interest to the second content display buffer;
the video projector to project an aligned image having the aligned projected region of interest onto the surface and over the initial image within the border area.

2. The projection system of claim 1, wherein the border area of the surface is a first color and a projection display space of the surface is a second color different from the first color.

3. The projection system of claim 1, comprising:
sensors to detect the border area and the initial projected region of interest and communicate with the graphical processing unit.

4. The projection system of claim 1, wherein the surface is a touch sensitive mat for user interaction.

5. A method of operating a projection system to adjust a projected image comprising:
receiving projection surface border values of a projection surface;
generating, with a central processing unit controlled by an operating system to execute instructions, image content including an initial image;
storing the image content including the initial image in a first content display buffer;
projecting the initial image onto the projection surface with a projecting device;
receiving initial projection display region values of the image projection on the projection surface;
performing an alignment transformation with a graphical processing unit directly coupled with a sensing system to be independent of the operating system and the central processing unit evaluate the image content including the initial image in the first content display buffer, the projection surface border values, and the initial projection display region values of the image projection;
generating an aligned display content with the graphical processing unit to adjust the image projection to align with the projection surface;
storing the adjusted image projection aligned with the projection surface in a second content display buffer of the graphical processing units; and
projecting the adjusted image projection aligned with the projection surface onto the projection surface, over the initial image, and within a surface border of the projection surface.

6. The method of claim 5, wherein the aligned display content is created continuously.

7. The method of claim 5, wherein the aligned display content is created to meet a determined threshold.

8. The method of claim 5, wherein the initial projection display region is skewed, rotated, or includes asymmetric distortion with respect to the projection surface border.

9. The method of claim 5, comprising:
detecting the projection surface and the image projection via sensors.

10. A non-transitory computer-readable storage medium storing computer executable instructions for controlling a projection system to perform a method of adjusting a projector display comprising:
detecting a border position of a projection surface via a sensing system;
generating, with a central processing unit controlled by an operating system to execute instructions, image content including an initial image;
storing the image content including the initial image in a first content display buffer;
communicating the image content including the initial image from the first content display buffer to a projector;
projecting the initial image toward the projection surface via the projector, the projected initial image having an initial projected region of interest within a projected display;
detecting the initial projected region of interest via the sensing system;
communicating the detected border position and the initial projected region of interest from the sensing system and the image content including the initial image from the first content display buffer to a graphical processing unit;
transforming, with the graphical processing unit, the initial projected region of interest to coincide with the border position, the graphical processing unit directly coupled with the sensing system to be independent of the operating system and the central processing unit evaluate the detected border position and the initial projected region of interest from the sensing system and the image content including the initial image from the first content display buffer;
generating aligned image display content of an aligned projected region of interest coinciding with the border position with the graphical processing unit;
storing the aligned image display content in a second content display buffer of the graphical processing unit;

communicating the aligned image display content to the projector; and projecting the aligned projected region of interest over the initial projected region of interest within the border.

11. The computer-readable storage medium of claim 10, wherein detecting the border position is by detecting four corners of the border.

12. The computer-readable storage medium of claim 10, wherein detecting the initial projected region of interest is by detecting four corners of the initial projected region of interest.

* * * * *